No. 757,401. PATENTED APR. 12, 1904.
M. C. HARLAN.
ANIMAL TRAP.
APPLICATION FILED JULY 27, 1903.
NO MODEL.
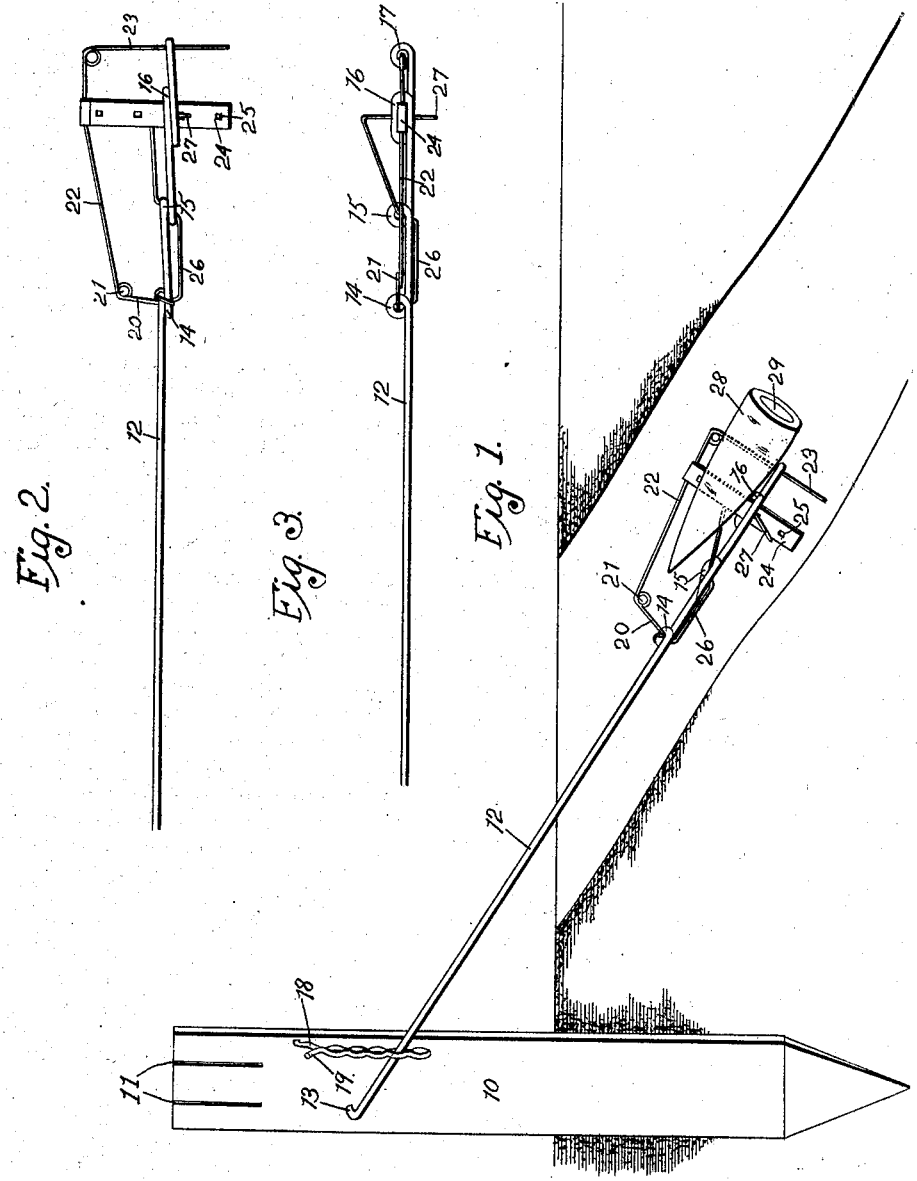
Witnesses.
K. K. Keffer.
A. G. Hague
Inventor, M. C. Harlan,
by Quirig & Lane Atty's.

No. 757,401. Patented April 12, 1904.

UNITED STATES PATENT OFFICE.

MARTIN C. HARLAN, OF STUART, IOWA.

ANIMAL-TRAP.

SPECIFICATION forming part of Letters Patent No. 757,401, dated April 12, 1904.

Application filed July 27, 1903. Serial No. 167,135. (No model.)

*To all whom it may concern:*

Be it known that I, MARTIN C. HARLAN, a citizen of the United States, residing at Stuart, in the county of Guthrie and State of Iowa, have invented certain new and useful Improvements in Animal-Traps, of which the following is a specification.

The object of my invention is to provide a simple, durable, and inexpensive trap especially designed for use in giving poison to burrowing animals, such as gophers, &c.

More specifically, it is my object to provide an arm pivoted to a stake, said stake to be placed in the ground adjacent to the subterranean passage of a burrowing animal, and to provide means for adjustably securing said arm at various angles relative to the stake, and, further, to provide a bait-holder on the end of said arm, so arranged as to firmly support the bait in the exact center of the passage-way and obstruct the said passage-way and to hold the bait in such manner that it cannot be pushed aside nor detached from the bait-holder, and also to provide a bait-holder with which the bait may be readily, quickly, and easily connected.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective a stake driven in the ground adjacent to the passage-way and having my improved bait-holder and adjustable arm connected with the stake and arranged in the center of the passage-way as required for use. Fig. 2 shows a side elevation of one end of the arm and the bait-holder thereon, and Fig. 3 shows a top or plan view of the same.

Referring to the accompanying drawings, I have used the reference-numeral 10 to indicate the stake, preferably made of wood, sharpened at its lower end and having two upright slots 11 in its upper end. These slots are intended to be used to receive the end portion of a piece of cardboard or metal, which is preferably of a bright color, so that the user of the trap may distinguish said card or metal at a considerable distance to prevent loss of the traps.

The reference-numeral 12 indicates an arm, preferably made of stiff wire, having one end, 13, pivoted to the stake 10 and having near its other end a round loop 14, a second round loop 15, an oval loop 16, and a third round loop 17 at said end for purposes hereinafter made clear. I provide means for adjustably supporting said arm relative to the stake, as follows: The numeral 18 indicates a piece of spring-wire fixed to the stake adjacent to its pivoted end 13. This wire extends downwardly and then upwardly and is corrugated. The upper end of the upwardly-projecting portion is inclined outwardly at 19, and the arm 12 is placed between these corrugated parts, and the said wire yieldingly holds the arm 12 between any one of the numbers of corrugations in which it may be placed, so that the arm may be readily and quickly adjusted to different angles relative to the stake, and when so adjusted it will be held against up and down movements and also against lateral movements, except that when sufficient force is applied thereto it may move upwardly and downwardly by springing apart the portions of the wire 18. This may be done when the operator grasps the arm 12 and pulls it either upwardly or downwardly.

The bait-holder comprises a piece of spring-wire the central portion of which is secured to the loop 14. Said wire is projected upwardly from said loop at 20, provided with a coil 21, and extended substantially parallel with the arm 12 at 22, one end portion 23 being extended downwardly through the loop 17. The coil 21 permits the end 23 to be moved upwardly out of the loop 17 by springing the wire. Fixed to the part 22 is a flat bar 24, having a series of openings 25 therein. This flat bar is parallel with the end 23, and its lower end is shaped to pass through the oblong loop 16 of the arm 12. The other end portion of the spring-wire is extended parallel with the arm 12 at 26 and is passed through the loop 15 and then inclined laterally and away from the arm 12, and its end portion 27 is designed to pass through one of the openings 25 on the bar 24 beneath the arm 12.

The bait 28, which may be a piece of sweet potato, is prepared for use by cutting a slot in one end thereof and inserting therein a poison-plug 29. The other end of the bait is slotted in the same way. In attaching the bait I first spring the end 27 away from the arm 12 and then raise the part 22 until the end 23 and the bar 24 are out of the loops 17 and 16. Then the bait is placed between the parts 22 and the arm 12, with the poisoned end projecting slightly beyond the arm 12, and the bait is made to rest upon the top of said arm. Then the flat bar 24 is passed downwardly through the slot in the rear end of the bait, and the end 23 is forced through the bait, the bar 24 passing through the loop 16 and the end 23 through the loop 17. Both the bar and the end 23 are forced downwardly as far as possible, and then the end 27 is passed through one of the openings 25 beneath the arm 12, thus securely locking the said bar in position and preventing the part 23 from springing upwardly away from the arm 12. By this means the bait is securely held with one end projecting beyond the bait-holder, and the bait is prevented from moving upwardly from the arm 12 by means of the part 22 resting on top of it and being held by the end 23 through the bar 24. The bait is prevented from moving as on a pivot, because both the end 23 and the bar 24 pass vertically through it, thus preventing such swinging movements. After the bait is attached to the holder the operator uncovers one end of the subterranean passage and places the arm 12 in said passage-way. He then forces the stake 10 in the ground-surface adjacent to the passage-way and adjusts the arm 12 so that the bait will stand directly in the center of said passage-way, thus obstructing it.

Having thus described my invention, what I claim, and desire to secure by Letters Patent of the United States therefor, is—

1. An improved animal-trap, comprising in combination a stake, an arm pivoted to the stake, a bait-holder at the free end of the arm and a yieldingly-corrugated holder fixed to the stake and adjustably supporting said arm.

2. An improved animal-trap, comprising in combination a stake, an arm pivoted to the stake and having a number of loops formed in its free end, a spring-wire having its central portion fixedly connected with one of said loops and having a portion extended substantially parallel with the arm and having one end passed downwardly through one of the loops in the arm, a bar formed on or fixed to the arm, having a number of openings therein and passed downwardly through one of the loops in the arm, the other end of said spring-wire designed to pass through one of the openings in said bar, beneath the arm.

3. In a device of the class described, the combination of a stake, a wire arm pivoted to the stake and having three round loops and one oblong loop formed in its free end portion, a spring-wire having its central portion secured to one of said loops and having a part extended substantially parallel with and above the arm and having one end extended downwardly through one of the loops in the arm, a flat bar having openings therein fixedly attached to the spring-wire and extended downwardly through one of the openings in the arm, the other end of said spring-wire passing first through one of the openings in the arm, then extended laterally, and having an end to project through the openings in the bar beneath the arm, arranged and combined substantially in the manner set forth and for the purposes stated.

MARTIN C. HARLAN.

Witnesses:
A. B. JONES,
J. P. McLAUGHLIN.